JAMES CHRISTIE, OF ATLANTA, ILLINOIS, AND HENRY G. DAYTON, OF MAYSVILLE, KENTUCKY.

Letters Patent No. 87,397, dated March 2, 1869.

IMPROVED CATTLE-FOOD.

The Schedule referred to in these Letters Patent and making part of the same.

To all whom it may concern:

Be it known that we, JAMES CHRISTIE, of Atlanta, Logan county, State of Illinois, and HENRY G. DAYTON, of Maysville, Mason county, State of Kentucky, have invented or discovered a new and useful Mode of Utilizing the Residuum of Grain after Distillation, commonly termed "Slop;" and that the following is a full and clear description of the same.

It is very well known that the grain, after passing through the still, whereby the alcohol is extracted, contains much nitrogenous and fattening-matter, which is used at every distillery for feeding cattle and hogs.

The objection, however, to feeding distillery-"slop," or "swill," is, that as it flows from the still, it is diluted with four or five times its bulk of water, which is not only not nutritious, but also, containing more or less acid, tends to promote too rapid fermentation, whereby the valuable qualities of the grain as food are destroyed, and great tendency to "scouring," or diarrhœa, in the animals, is produced, and the substance passes through the beast without proper digestion.

This, however, is not the only objection in feeding the refuse of a distillery, for, even if the water were by any process dried out, the crushed grain remaining would be too rich, strong, or heavy, as it is termed, for the entire feed, and would require some more bulky substance as a dilutant, as hay, straw, or some other fodder, to be fed to the animals. This, again, is not easy to be done at a distillery, which generally has not conveniencies for storing hay or straw.

Our discovery, after much observation and long practical experience, seems to avoid all these objections, and to provide a way in which the slop may be most advantageously used, with the very means found at the distillery, viz, the cobs of corn.

Corn-cobs, which are usually thrown away or burned, contain some nutriment, and have a large proportion of potash and phosphates, which are really of great value in the food of stock. While mentioning cobs as a very natural and important element in our process, we do not confine ourselves to them, but propose to include hay, and straw, and any nutritious and bulky substance.

We propose to place the cobs or fodder, cracked, chopped, crushed, or ground, in a tank, tub, vat, or any suitable receptacle, upon which the mash or liquid swill, or slop, shall flow, after distillation, just fast enough to allow it to filter slowly through the mass, whereby all the solid and nutritious portion of the slop is retained, and incorporated with the crushed cobs or fodder, which also, by the action of the warm liquid, becomes soft and palatable.. Thus we utilize two substances of small value by themselves, and make a valuable, rich, substantial fattening-food for cattle or hogs.

After the liquid has ceased to flow, salt might be added, if thought best, and the compound might be prepared for transportation by pressing, desiccation, or otherwise.

What we claim, and desire to secure by Letters Patent, is—

The preparation of cattle-food in the manner substantially as set forth.

JAMES CHRISTIE.
HENRY G. DAYTON.

Witnesses:
  JOS. SIEGWART,
  FRED. F. MILLER.